US011514110B2

(12) United States Patent
Glatfelter et al.

(10) Patent No.: US 11,514,110 B2
(45) Date of Patent: Nov. 29, 2022

(54) METHOD AND SYSTEM FOR FLIGHT SCHEDULING

(71) Applicant: The Boeing Company, Chicago, IL (US)

(72) Inventors: John W. Glatfelter, Kennett Square, PA (US); Brian D. Laughlin, Wichita, KS (US); Terrence J. McGowan, Isle of Palms, SC (US); Donald B. Cummings, Summerville, SC (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 16/778,330

(22) Filed: Jan. 31, 2020

(65) Prior Publication Data

US 2021/0240772 A1    Aug. 5, 2021

(51) Int. Cl.
| | |
|---|---|
| *G06F 16/00* | (2019.01) |
| *G06F 16/9035* | (2019.01) |
| *G06F 16/9038* | (2019.01) |
| *B64D 11/00* | (2006.01) |
| *G08G 5/00* | (2006.01) |
| *G06N 20/00* | (2019.01) |
| *G06Q 10/02* | (2012.01) |

(52) U.S. Cl.
CPC ......... *G06F 16/9035* (2019.01); *B64D 11/00* (2013.01); *G06F 16/9038* (2019.01); *G06N 20/00* (2019.01); *G06Q 10/02* (2013.01); *G08G 5/003* (2013.01)

(58) Field of Classification Search
None
See application file for complete search history.

(56) References Cited

U.S. PATENT DOCUMENTS

| | | | | |
|---|---|---|---|---|
| 5,832,454 | A * | 11/1998 | Jafri .................. | G06Q 10/02 705/6 |
| 6,304,850 | B1 * | 10/2001 | Keller ................. | G06Q 10/02 705/5 |
| 8,086,653 | B1 * | 12/2011 | Walker ................ | G06Q 20/02 707/899 |
| 8,874,459 | B1 * | 10/2014 | Green ................. | G06Q 10/08 701/120 |
| 11,395,022 | B1 * | 7/2022 | Chachare ............ | H04N 21/252 |

(Continued)

*Primary Examiner* — Jean M Corrielus
(74) *Attorney, Agent, or Firm* — McDonnell Boehnen Hulbert & Berghoff LLP

(57) ABSTRACT

A computer-implemented method includes searching, by machine learning logic of a computer, a flight schedule database for one or more flight schedule records related to flight preference information specified by a user. The machine learning logic is trained with training data that includes flight schedules selected by passengers and flight preference information associated with the passengers. The method further includes responsive to locating the one or more flight schedule records, communicating, by the computer, flight schedules associated with the one or more flight schedule records to a terminal associated with the user. The method includes receiving, from the terminal, a booking indication associated with a particular flight schedule of the flight schedules and updating the training data to associate the particular flight schedule with the flight preference information specified by the user.

20 Claims, 6 Drawing Sheets

(56) References Cited

U.S. PATENT DOCUMENTS

| | | | | |
|---|---|---|---|---|
| 2002/0178034 A1* | 11/2002 | Gardner | ................ | G06Q 10/02 |
| | | | | 705/5 |
| 2004/0010578 A1* | 1/2004 | Demetriades | ........ | G08G 5/0095 |
| | | | | 709/223 |
| 2004/0015409 A1* | 1/2004 | Chittenden | ............ | G06Q 10/02 |
| | | | | 705/26.1 |
| 2004/0015605 A1* | 1/2004 | Demetriades | .......... | G08G 1/202 |
| | | | | 709/238 |
| 2005/0033616 A1* | 2/2005 | Vavul | .................... | G06Q 10/02 |
| | | | | 705/5 |
| 2007/0219833 A1* | 9/2007 | Trautman | ............. | G06Q 10/063 |
| | | | | 705/5 |
| 2009/0287513 A1* | 11/2009 | Anderson | ............ | G06Q 10/02 |
| | | | | 705/6 |
| 2010/0023357 A1* | 1/2010 | Walker | ............... | G06Q 30/0601 |
| | | | | 705/5 |
| 2010/0094669 A1* | 4/2010 | Walker | ............... | G06Q 30/0633 |
| | | | | 705/5 |
| 2011/0225188 A1* | 9/2011 | Lopinto | ................ | G06Q 50/14 |
| | | | | 707/770 |
| 2012/0089476 A1* | 4/2012 | Walker | ................... | G06Q 30/02 |
| | | | | 705/26.4 |
| 2014/0114705 A1* | 4/2014 | Bashvitz | ............. | G06Q 10/047 |
| | | | | 705/5 |
| 2014/0279172 A1* | 9/2014 | Walker | ................ | G06Q 20/201 |
| | | | | 705/26.4 |
| 2016/0283869 A1* | 9/2016 | Williams | ........... | G06Q 30/0283 |
| 2016/0378874 A1* | 12/2016 | Jafri | ........................ | H04L 67/02 |
| | | | | 707/706 |
| 2020/0401906 A1* | 12/2020 | Watson | .................... | G07C 5/08 |

* cited by examiner

Flight Schedule Records
300

| Schedule | Date/Time | Equipment Type | Crew experience level | Passenger seating environment | Flight turbulence levels |
|---|---|---|---|---|---|
| 1 | January 1, 9AM | 737 | 1 | 10 isle, 20 center, 10 window | 5 |
| 2 | January 1, 5PM | 787 | 5 | 3 isle, 20 center, 1 window | 1 |
| 3 | January 2, 12PM | 777 | 3 | 5 isle, 15 center, 10 window | 3 |
| ... | ... | ... | ... | ... | ... |
| N | January 2, 5PM | 737 | 2 | 20 isle, 30 center, 20 window | 2 |

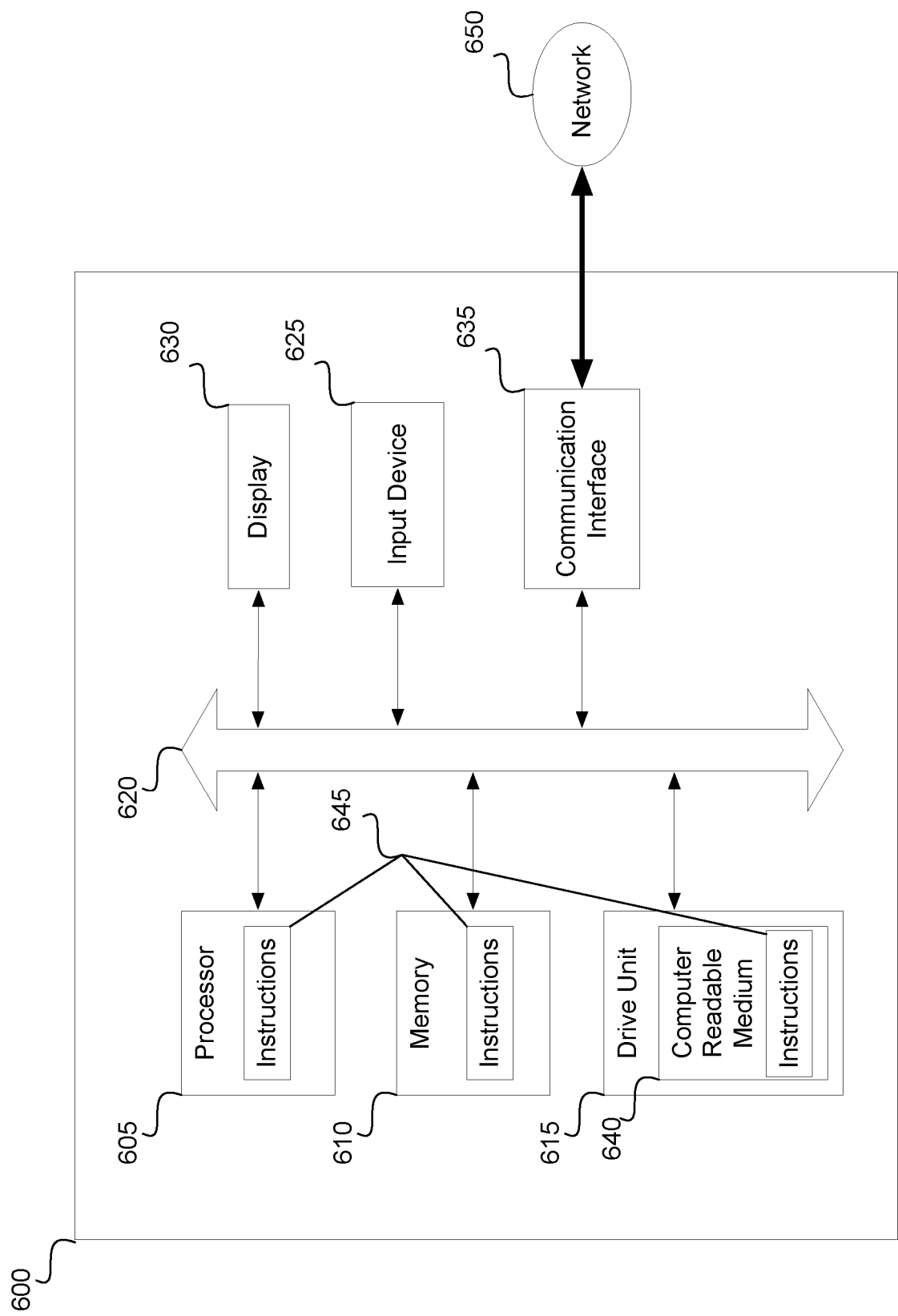

METHOD AND SYSTEM FOR FLIGHT SCHEDULING

BACKGROUND

Field

This application generally relates to passenger travel. In particular, this application describes a method and system for flight scheduling.

Description of Related Art

As the competition among airlines has increased, airlines have had to consider new ways to improve and/or maintain revenue. For example, airlines may reduce the number of flights between cities and attempt to fill as many seats as possible on the remaining flights. Airlines may charge extra fees for ancillary services, such as fees for carrying extra luggage, and fees for food and beverages. In some cases, airlines charge an extra fee for particular seats. For example, seats in the economy section of an aircraft with more legroom may cost more than other seats in the economy section.

These and other aspects have made booking a flight with an airline more difficult. For example, a traveler booking a flight to a particular destination via a travel website may be presented with numerous flight options. But some of the options may not be suitable for the traveler for various reasons, such as lack of available seating that suits the needs of the traveler. These and other issues will become apparent upon reading the present disclosure.

SUMMARY

In a first aspect, a computer-implemented method is provided. The computer-implemented method includes searching, by machine learning logic of a computer, a flight schedule database for one or more flight schedule records related to flight preference information specified by a user. The machine learning logic is trained with training data that includes flight schedules selected by passengers and flight preference information associated with the passengers. The method further includes responsive to locating the one or more flight schedule records, communicating, by the computer, flight schedules associated with the one or more flight schedule records to a terminal associated with the user. The method includes receiving, from the terminal, a booking indication associated with a particular flight schedule of the flight schedules and updating the training data to associate the particular flight schedule with the flight preference information specified by the user.

In a second aspect, a system includes a memory and a processor. The memory stores instruction code. The processor is in communication with the memory. The instruction code is executable by the processor to cause the processor to perform operations that include searching, by machine learning logic implemented by the instruction code, a flight schedule database for one or more flight schedule records related to flight preference information specified by a user. The machine learning logic is trained with training data that includes flight schedules selected by passengers and flight preference information associated with the passengers. Responsive to locating the one or more flight schedule records, the processor communicates flight schedules associated with the one or more flight schedule records to a terminal associated with the user. The processor receives, from the terminal, a booking indication associated with a particular flight schedule of the flight schedules; and updates the training data to associate the particular flight schedule with the flight preference information specified by the user.

In a third aspect, a non-transitory computer-readable medium having stored thereon instruction code is provided. When the instruction code is executed by a processor of a computer, the processor performs operations that include searching, by machine learning logic implemented by the instruction code, a flight schedule database for one or more flight schedule records related to flight preference information specified by a user. The machine learning logic is trained with training data that includes flight schedules selected by passengers and flight preference information associated with the passengers. Responsive to locating the one or more flight schedule records, the processor communicates flight schedules associated with the one or more flight schedule records to a terminal associated with the user. The processor receives, from the terminal, a booking indication associated with a particular flight schedule of the flight schedules; and updates the training data to associate the particular flight schedule with the flight preference information specified by the user.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 3 illustrates flight schedule records that can be stored in the schedule database, in accordance with an example.

FIG. 6 illustrates a computer system that can form part of or implement any of the systems or devices of the environment, in accordance with an example.

DETAILED DESCRIPTION

Figure 1:
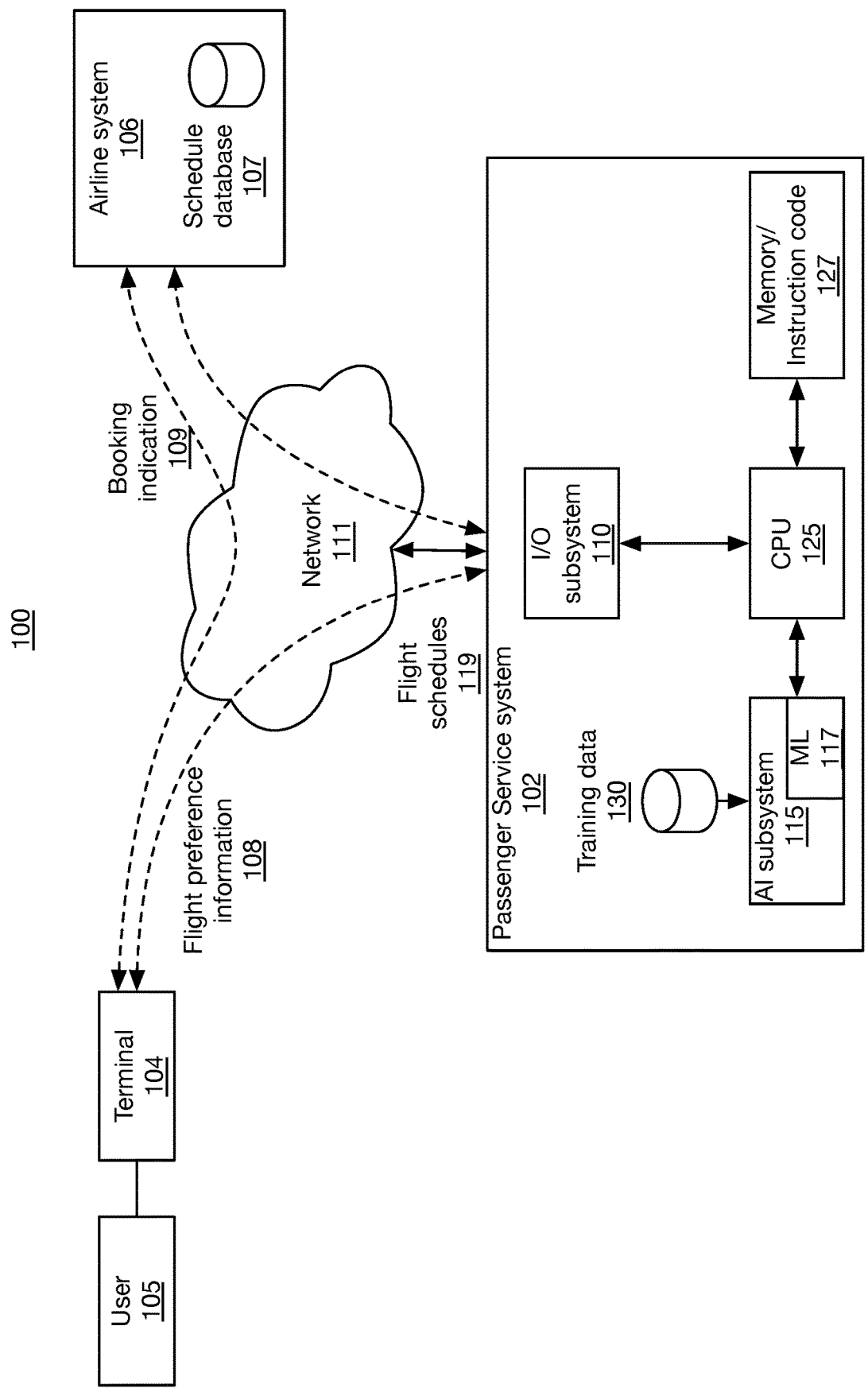
FIG. 1 illustrates an environment that includes various systems/devices that facilitate passenger flight scheduling, in accordance with an example.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

I. Introduction

As noted above, booking a flight with an airline has become more difficult. For example, a traveler booking a flight to a particular destination via a travel website may be presented with numerous flight options. But some of the options may not be suitable for the traveler for various reasons, such as lack of available seating that suits the needs of the traveler.

These problems are overcome by the examples described below. In the examples, a passenger service system is configured to receive flight preference information from a traveler and to provide the traveler with a set of flight options that most closely match the traveler's flight preferences. The flight preference information can specify, among other things, preferred dates of travels and a preferred seating environment. The preferred seating environment can specify types of seats preferred by the traveler (e.g., aisle seats, seats that accommodate large frames).

The passenger service system utilizes machine learning logic to predict those flights that a traveler with a particular set of flight preferences would desire. In this regard, the machine learning logic may have been previously trained with training data that includes flight schedules selected by passengers and flight preference information associated with these passengers.

FIG. 1 illustrates an example of an environment 100 that includes various systems/devices that facilitate passenger flight scheduling. Example systems/devices of the environment 100 include a passenger service system (PSS) 102, a user terminal 104, and an airline system 106. The various entities of the environment 100 can be configured to communicate with one another via a network 111, such as the Internet.

The PSS 102 can include a memory 127 and a processor 125. As will be described in further detail below, the memory 127 stores instruction code and the processor 125 is in communication with the memory 127. The instruction code is executable by the processor 125 and causes the processor 125 to perform various operations described in further detail below for facilitating passenger flight scheduling. An example of the PSS 102 can also include an input/output (I/O) subsystem 110, and an artificial intelligence (AI) subsystem 115. Details related to the various subsystems of the PSS 102 and the operations performed by these subsystems are described in further detail below.

The processor 125 executes instruction code stored in the memory 127 for coordinating activities performed between the various subsystems. The processor 125 can correspond to a stand-alone computer system such as an Intel®, AMD®, or PowerPC® based computer system or a different computer system and can include application-specific computer systems. The computer system can include an operating system, such as Microsoft Windows®, Linux, Unix®, or another operating system.

The I/O subsystem 110 can include one or more input, output, or input/output interfaces and is configured to facilitate communications with entities outside of the PSS 102. In this regard, an example of the I/O subsystem 110 can be configured to dynamically determine the communication methodology utilized by entities of the environment 100 and can communicate information to the entities with an interface that uses a determined communication methodology. For example, the I/O subsystem 110 can determine that a first entity utilizes a RESTful API and can, therefore, communicate with the entity using an interface that uses a RESTful communication methodology.

In examples, the I/O subsystem 110 can implement a web browser to facilitate generating one or more web-based interfaces through which users of the PSS 102, and/or other systems of the environment can interact with the PSS 102. The web browser can implement a web services interface to facilitate automating some of the web-based functionality via a computer. For example, one or more of the entities of the environment 100 can utilize the web services interface to access information stored by the PSS 102 and/or to communicate information to the PSS 102.

An example of the AI subsystem 115 can correspond to hardware, software, or a combination thereof that is specifically configured to implement or assist in the implementation of various supervised and unsupervised machine learning models. The machine learning logic 117 of the AI subsystem 115 can be based on algorithms such as a Holt-Winters algorithm, an exponential time smoothing (ETS) algorithm, an artificial neural network (ANN), a recurrent neural network (RNN), a seasonal autoregressive moving average (SARIMA) algorithm, a network of long short-term memories (LSTM), a gated recurring unit (GRU) algorithm. Examples of the AI Subsystem 115 can implement other machine learning logic 117 and/or AI algorithms.

Examples of the AI subsystem 115 can be further configured to perform or assist in the performance of various natural language processing techniques such as latent Dirichlet allocation (LDA) to identify topics within example text, hierarchical density-based cluster analysis (H-DB-SCAN) to group example text under one or more topics, Knuth-Morris-Pratt string searching to locate and extract occurrences of a certain words within text, possibly linear clustering algorithms to mine text data, and/or other techniques.

It is contemplated that the I/O subsystem 110, AI subsystem 115, and any other subsystem referenced herein can correspond to a stand-alone computer system such as an Intel®, AMD®, or PowerPC® based computer system or a different computer system and can include application-specific computer systems. The computer systems can include an operating system, such as Microsoft Windows®, Linux, Unix®, or another operating system. It is also contemplated that operations performed on the various subsystems can be combined into a fewer or greater number of subsystems to facilitate speed scaling, cost reductions, etc.

An example of the user terminal 104 can correspond to a computer, mobile device, tablet, and/or any other device that facilitates specifying, by a user 105 information related to flight preference information. The user terminal 104 can include a processor, a memory, and communication circuitry. The communication circuitry can facilitate networked communications with the PSS 102 and, in some examples, the airline system 106.

One example of the user terminal 104 can include an operating system and an application that operates in conjunction with the operating system to facilitate interactions with the PSS 102 and the airline system 106. In this regard, the memory can include instruction code executable by the processor for operating the application. The operating system can correspond to Microsoft Windows®, Linux, Apple IOS®, Android®, or a different operating system.

Figure 2:
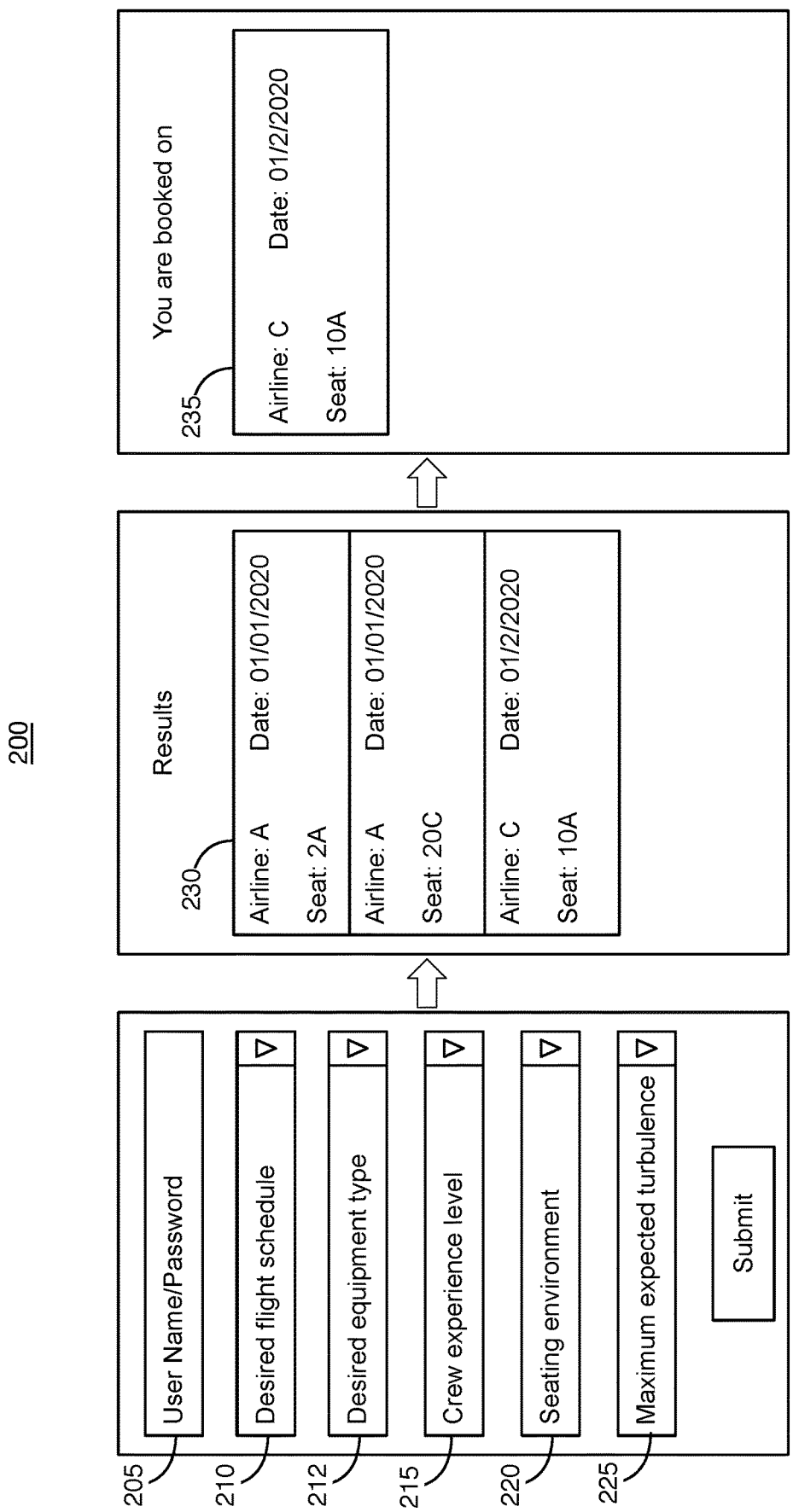
FIG. 2 illustrates a user interface that can be generated by an application of a terminal of the environment, in accordance with an example.

FIG. 2 illustrates an example of a user interface 200 that can be generated by the application to facilitate specification of the flight preference information. Referring to FIG. 2, the user interface 200 can include a first control 205 that facilitates specifying, by the user 105, passenger identifying information such as a username and password. The passenger identifying information can facilitate authenticating the user 105 with the application, the PSS 102, and/or the airline system 106.

An example of the user interface 200 can include a second control 210 that facilitates specifying, by the user 105, a desired flight schedule, such as a range of dates and times during which the user 105 is willing to travel.

An example of the user interface 200 can include a third control 212 that facilitates specifying, by the user 105, one or more equipment types, such as a type of aircraft the passenger desires to travel upon. Within examples, the equipment type can specify a particular aircraft (e.g., Boeing 777, 787, etc.), an aircraft size (e.g., a number of seats), an aircraft age, whether the aircraft uses props or jet engines. Other aspects that facilitate defining the equipment type can be specified.

An example of the user interface 200 can include a fourth control 215 that facilitates specifying a desired crew experience level. For example, a numeric value indicative of a desired crew experience level can be specified (e.g., 1=minimally experienced, 5=highly experienced).

An example of the user interface 200 can include a fifth control 220 that facilitates specifying a desired passenger seating environment. For example, the passenger seating environment can specify a desired location in the aircraft (e.g., first-class, back of aircraft, aisle seats, window seats). The passenger seating environment can specify the desired seating environment in terms of a passenger's physical type. For example, seats that can accommodate large framed passengers.

An example of the user interface 200 can include a sixth control 225 that facilitates specifying a maximum expected flight turbulence level. For example, a numeric value indicative of a maximum expected flight turbulence level can be specified (e.g., 1=expected to be smooth, 5=expected to be rough).

After specifying the information above, the user 105 can submit the information. In this regard, the information can be communicated to the PSS 102. Responsive to submission of the information, a result list 230 can be communicated from the PSS 102 to the terminal 104 for presentation via the user interface 200. The result list 230 can specify various flight options that match or most closely match the user's specified preferences. The user 105 can select one of the flight options from the result list 230. This can trigger the application to book the desired flight option. For example, the application can be configured to communicate the request to the PSS 102, which can, in turn, book the flight with the airline system 106. In another example, the application can communicate the request directly to the airline system 106 for booking a flight associated with the flight option.

After submission of the request, the terminal can receive a booking result 235 that indicates information related to the booked flight. In some examples, the booking result 235 can include information that facilitates ticketing operations at an airport. For example, the booking result 235 can include a QR code that can be scanned at the airport to confirm passenger booking.

An example of the airline system 106 can correspond to a computer system operated by a particular airline. The airline system 106 can include a schedule database 107 that includes flight schedule records that relate information associated with various flights. While a single airline system 106 is illustrated, it should be understood that there can be additional airline systems 106 in communication with the PSS 102 and the terminal 104. Each airline system 106 can be operated by a different airline.

FIG. 3 illustrates examples of flight schedule records 300 that can be stored in the schedule database 107. Referring to FIG. 3, within examples, a first field 305 can specify different dates and times associated with a particular flight. A second field 310 can specify an equipment type (e.g., a particular aircraft model, an aircraft size, an aircraft age, whether the aircraft uses props or jet engines, and/or other information). A third field 315 can specify a numeric value indicative of the experience level associated with a crew that will operate the flight (e.g., 1=minimally experienced, 5=highly experienced). A fourth field 320 can specify a passenger seating environment, such as the number and types of seats that are available. A fifth field 325 can specify a numeric value indicative of a maximum expected flight turbulence level for the flight. Other fields related to other aspects associated with flights can be specified in the schedule database 107.

In some examples, the flight schedule records 300 of the schedule database 107 can include one or more fields for associating particular seats with particular passengers. For example, the fields can specify passenger identifying information such as a name, address, etc. and associate the passenger identifying information with a particular seat, such as seat 10B.

Additionally, or alternatively, in some examples, a body type can be associated with a particular seat. For example, one or more fields can associate a body type (e.g., large frame, medium frame, or small frame) with a particular seat on an aircraft to indicate the relative size of the passenger assigned to a particular seat. In this regard, in some examples, the airline system 106 can be in communication with scanning equipment that can be arranged, for example, near the entrance gate of an aircraft. The scanning equipment can be configured to scan passengers as they enter the aircraft. The scanning equipment can determine or facilitate determining the body type (e.g., large frame, medium frame, or small frame) of the passenger and can associate the body type with the seat to which the passenger is assigned. The information can be communicated to the airline system 106, and the airline system 106 can update the flight schedule record in the schedule database 107 associated with the flight accordingly.

Figure 4:
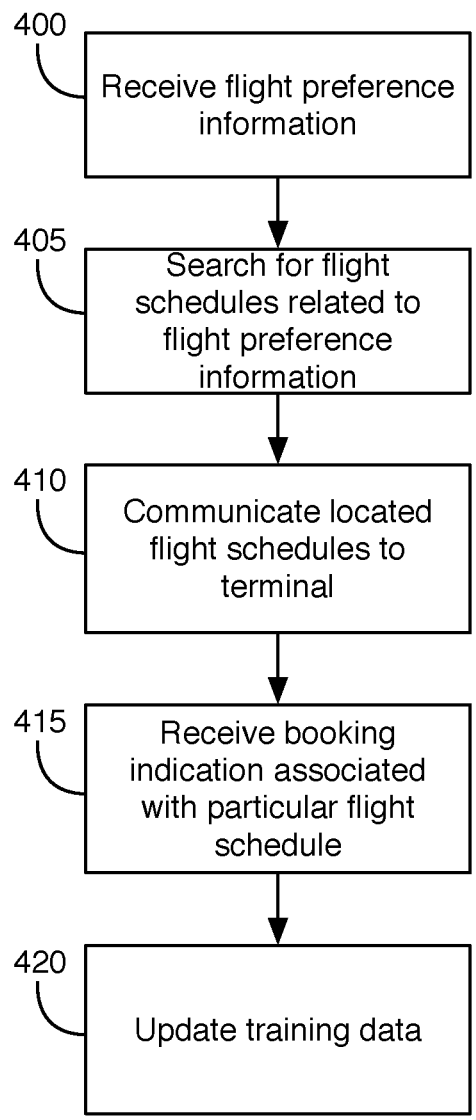
FIG. 4 illustrates operations performed by a passenger service system of the environment, in accordance with an example.

FIG. 4 illustrates examples of operations performed by the PSS 102. In this regard, one or more of the operations can be implemented via instruction code, stored in the memory 127 of the PSS 102, configured to cause the processor 125 of the PSS 102 to perform the operations illustrated in the figures and discussed herein.

At operation 400, the PSS 102 can receive flight preference information 108 from a user 105. In this regard, the flight preference information 108 can specify one or more of an aircraft equipment type, an aircraft crew experience level, an aircraft passenger seating environment, a body type associated with the user 105, and aircraft predicted flight turbulence levels. Other information can be specified.

In some examples, the PSS 102 can associate the user 105 with the flight preference information 108 so that the user 105 does not have to re-specify the flight preference information 108. In these examples, when the user 105 launches the application on the terminal 104, the PSS 102 can communicate the stored flight preference information 108 to the application, and the application can pre-populate the controls in the user interface 200 with the stored flight preference information 108.

At operation 405, machine learning logic 117 of the PSS 102 can search a flight schedule database 107 for one or more flight schedule records 300 related to flight preference information 108 specified by the user 105. In this regard, the machine learning logic 117 can be trained with training data 130 that includes flight schedules selected by passengers and flight preference information 108 associated with these passengers. A training algorithm used for training the machine learning logic 117 can be used to train the machine learning logic 117 to configure associations between various types of preference information and various types of flights. The various types of preference information may have been previously known to be associated with the various types of flights.

After the associations are configured, the input of a particular combination of preference information into the machine learning logic 117 causes the machine learning logic 117 to predict one or more flight schedules that a passenger associated with the preference information would likely desire.

At operation 410, the machine learning logic 117 can determine that one or more flight schedule records 300 related to the flight preference information 108 specified by the user 105 exist. The PSS 102 can then communicate flight schedules 119 or a subset of the flight schedules 119 associated with these flight schedule records 300 to the terminal 104.

At operation 415, the PSS 102 can receive a booking indication 109. The booking indication 109 can specify a particular flight schedule. In one example, the booking indication 109 can be communicated from the terminal 104 to the PSS 102. In another example, the terminal 104 can communicate the booking indication 109 to the airline system 106 associated with the flight schedule, and the airline system 106 can communicate the booking indication 109 to the PSS 102.

At operation 420, the training data 130 used for training the machine learning logic 117 can be updated to associate the particular flight schedule with the flight preference information 108 specified by the user 105. For example, a record that associates the flight preference information 108 specified by the user 105 and the particular flight schedule can be added to the training data 130. The machine learning logic 117 can then be retrained based on the updated training data 130.

In some examples, the PSS 102 and/or the terminal 104 can receive an indication of a change associated with a selected flight schedule. For example, the airline system 106 can communicate a message to the PSS 102 and/or the terminal 104 to indicate that a flight was canceled. In this case, the PSS 102 can search for the next best or different flight schedule associated with the flight preference information 108.

After finding an alternate flight schedule, the PSS 102 can communicate the alternate flight schedule to the terminal 104 associated with the user 105. The PSS 102 and/or the airline system 106 can receive a further booking indication 109 associated with the alternate flight schedule. The PSS 102 can then update the training data 130 to associate the different flight schedule with the flight preference information 108 specified by the user 105.

Figure 5:
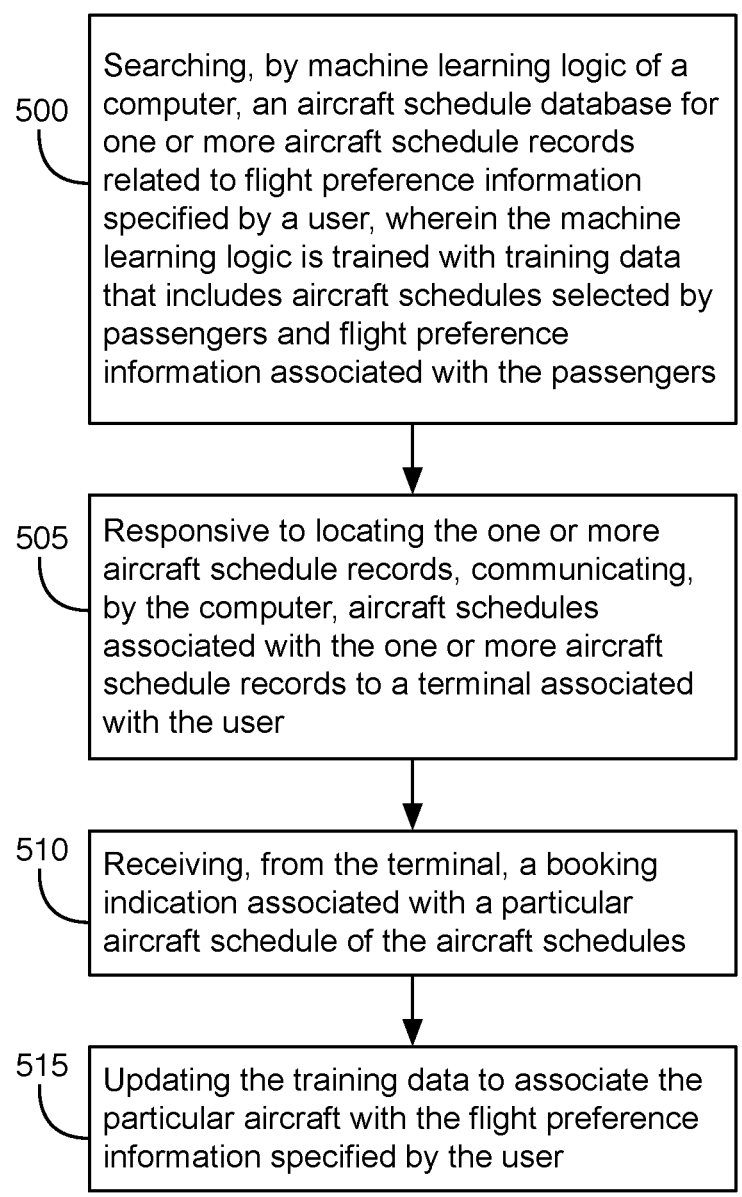
FIG. 5 illustrates a more detailed variation of the operations of FIG. 4, in accordance with an example.

FIG. 5 illustrates a more detailed variation of FIG. 4. Block 500 can involve searching, by machine learning logic 117 of a computer, a flight schedule database 107 for one or more flight schedule records 300 related to flight preference information 108 specified by a user 105, wherein the machine learning logic 117 is trained with training data 130 that includes flight schedules selected by passengers and flight preference information 108 associated with the passengers.

Block 505 can involve, responsive to locating the one or more flight schedule records 300, communicating, by the computer, flight schedules 119 associated with the one or more flight schedule records 300 to a terminal 104 associated with the user 105;

Block 510 can involve receiving, from the terminal 104, a booking indication 109 associated with a particular flight schedule of the flight schedules 119; and Block 515 can involve updating the training data 130 to associate the particular flight schedule with the flight preference information 108 specified by the user 105.

In some examples, the flight schedule records 300 specify an aircraft equipment type. In these examples searching the flight schedule database 107 for one or more flight schedule records 300 can involve searching, by the machine learning logic 117 of the computer, the flight schedule database 107 for one or more flight schedule records 300 related to a preferred equipment type specified in the flight preference information 108.

In some examples, the flight schedule records 300 specify an aircraft crew experience level. In these examples, searching the flight schedule database 107 for one or more flight schedule records 300 can involve searching, by the machine learning logic 117 of the computer, the flight schedule database 107 for one or more flight schedule records 300 related to a preferred crew experience level specified in the flight preference information 108.

In some examples, the flight schedule records 300 specify an aircraft passenger seating environment that further specifies types of passengers assigned to seats of aircraft. In these examples, searching the flight schedule database 107 for one or more flight schedule records 300 can involve searching, by the machine learning logic 117 of the computer, the flight schedule database 107 for one or more flight schedule records 300 related to a preferred passenger seating environment specified in the flight preference information 108.

In some examples, the preferred passenger seating environment of the flight preference information 108 specifies a body type associated with the user 105. These examples can involve identifying, by the computer and based on the passenger seating environment, one or more available seats on aircraft associated with the one or more flight schedule records 300 that accommodate passengers having the specified body type, and communicating, by the computer and to the terminal 104, seat availability information that specifies the one or more available seats to the terminal 104.

Some examples can involve associating passengers with seats of aircraft that are associated with the one or more flight schedule records 300; scanning the passengers as they board the aircraft to classify body types of the passengers, and updating the one or more flight schedule records 300 to relate the seats of the aircraft with body types of the passengers assigned to the seats.

In some examples, the flight schedule records 300 specify aircraft predicted flight turbulence levels. In these examples, searching the flight schedule database 107 for one or more flight schedule records 300 can involve searching, by the machine learning logic 117 of the computer, the flight schedule database 107 for one or more flight schedule records 300 related to a preferred flight turbulence level specified in the flight preference information 108.

Some examples can involve receiving, by the computer, an indication of an occurrence of a change associated with the particular flight schedule; responsive to receiving to the indication, searching, by machine learning logic 117 of the computer, for a different flight schedule related to the flight preference information 108 specified by the user 105; responsive to locating the different flight schedule, communicating, by the computer, the different flight schedule to the terminal 104 associated with the user 105; receiving, from the terminal 104, a further booking indication 109 associated with the different flight schedule; and updating the training data 130 to associate the different flight schedule with the flight preference information 108 specified by the user 105.

FIG. 6 illustrates an example of a computer system 600 that can form part of or implement any of the systems and/or devices described above. The computer system 600 can include a set of instructions 645 that the processor 605 can execute to cause the computer system 600 to perform any of the operations described above. An example of the computer system 600 can operate as a stand-alone device or can be connected, e.g., using a network, to other computer systems or peripheral devices.

In a networked example, the computer system 600 can operate in the capacity of a server or as a client computer in a server-client network environment, or as a peer computer system in a peer-to-peer (or distributed) environment. The computer system 600 can also be implemented as or incorporated into various devices, such as a personal computer or a mobile device, capable of executing instructions 645 (sequential or otherwise), causing a device to perform one or more actions. Further, each of the systems described can include a collection of subsystems that individually or jointly execute a set, or multiple sets, of instructions to perform one or more computer operations.

The computer system 600 can include one or more memory devices 610 communicatively coupled to a bus 620 for communicating information. In addition, code operable to cause the computer system to perform operations described above can be stored in the memory 610. The memory 610 can be random-access memory, read-only memory, programmable memory, hard disk drive, or any other type of memory or storage device.

The computer system 600 can include a display 630, such as a liquid crystal display (LCD), a cathode ray tube (CRT), or any other display suitable for conveying information. The display 630 can act as an interface for the user to see processing results produced by processor 605.

Additionally, the computer system 600 can include an input device 625, such as a keyboard or mouse or touchscreen, configured to allow a user to interact with components of system 600.

The computer system 600 can also include a disk or optical drive unit 615. The drive unit 615 can include a computer-readable medium 640 in which the instructions 645 can be stored. The instructions 645 can reside completely, or at least partially, within the memory 610 and/or within the processor 605 during execution by the computer system 600. The memory 610 and the processor 605 also can include computer-readable media as discussed above.

The computer system 600 can include a communication interface 635 to support communications via a network 650. The network 650 can include wired networks, wireless networks, or combinations thereof. The communication interface 635 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method comprising:

receiving, by a passenger service system and from a flight schedule database stored in an airline system that is in networked communication with the passenger service system, one or more flight schedule records that relate flight schedules selected by passengers and flight preference information associated with the passengers, wherein the airline system is configured to store flight schedule records to the flight schedule database responsive to scheduling of flights by passengers and wherein the flight schedule records specify an aircraft passenger seating environment that further specifies types of passengers assigned to seats of aircraft and the flight preference information specifies a preferred passenger seating environment;

automatically propagating, by the passenger service system, the one or more flight schedule records as training data through machine learning logic of the passenger service system to configure the machine learning logic to associate flight schedules with passenger preferences;

subsequently receiving, by the passenger service system and from a user terminal, flight preference information specified by a user;

determining, by the machine learning logic of a computer, one or more flight schedule records related to the flight preference information specified by the user including the preferred passenger seating environment that specifies a body type associated with the user;

responsive to determining the one or more flight schedule records, communicating, by the passenger service system, flight schedules associated with the one or more flight schedule records to the user terminal;

identifying, by the computer and based on the passenger seating environment, one or more available seats on aircraft associated with the one or more flight schedule records that accommodate passengers having the specified body type;

communicating, by the computer and to the user terminal, seat availability information that specifies the one or more available seats to the user terminal;

receiving, from the user terminal, a booking indication associated with a particular flight schedule of the flight schedules; and updating, by the passenger service system, the training data to associate the particular flight schedule with the flight preference information specified by the user.

2. The computer-implemented method according to claim 1, wherein the flight schedule records specify an aircraft equipment type, wherein determining one or more flight schedule records related to the flight preference information specified by the user comprises determining, by the machine learning logic one or more flight schedule records related to a preferred equipment type specified in the flight preference information.

3. The computer-implemented method according to claim 1, wherein the flight schedule records specify an aircraft crew experience level, wherein determining one or more flight schedule records related to the flight preference information specified by the user comprises determining, by the machine learning logic one or more flight schedule records related to a preferred crew experience level specified in the flight preference information.

4. The computer-implemented method according to claim 1, further comprising:
associating passengers with seats of aircraft that are associated with the one or more flight schedule records;
scanning the passengers as the passengers board the aircraft to classify body types of the passengers; and
updating the one or more flight schedule records to relate the seats of the aircraft with body types of the passengers assigned to the seats.

5. The computer-implemented method according to claim 1, wherein the flight schedule records specify aircraft predicted flight turbulence levels, wherein determining one or more flight schedule records related to the flight preference information specified by the user comprises determining, by the machine learning logic of the computer, one or more flight schedule records related to a preferred flight turbulence level specified in the flight preference information.

6. The computer-implemented method according to claim 1, further comprising:

receiving, by the computer, an indication of an occurrence of a change associated with the particular flight schedule;

responsive to receiving to the indication, searching, by machine learning logic of the computer, for a different flight schedule related to the flight preference information specified by the user;

responsive to locating the different flight schedule, communicating, by the computer, the different flight schedule to the user terminal associated with the user;

receiving, from the user terminal, a further booking indication associated with the different flight schedule; and updating the training data to associate the different flight schedule with the flight preference information specified by the user.

7. A system comprising:

a memory that stores instruction code; and a processor in communication with the memory, wherein the instruction code is executable by the processor to perform operations comprising:

receiving, from a flight schedule database stored in an airline system that is in networked communication with the system, one or more flight schedule records that relate flight schedules selected by passengers and flight preference information associated with the passengers, wherein the airline system is configured to store flight schedule records to the flight schedule database responsive to scheduling of flights by passengers and wherein the flight schedule records specify an aircraft passenger seating environment that further specifies types of passengers assigned to seats of aircraft and the flight preference information specifies a preferred passenger seating environment;

automatically propagating the one or more flight schedule records as training data through machine learning logic of the system to configure the machine learning logic to associate flight schedules with passenger preferences;

subsequently receiving from a user terminal, flight preference information specified by a user;

determining, by the machine learning logic implemented by the instruction code, one or more flight schedule records related to the flight preference information specified by the user including the preferred passenger seating environment that specifies a body type associated with the user;

responsive to determining the one or more flight schedule records, communicating flight schedules associated with the one or more flight schedule records to a user terminal;

identifying, based on the passenger seating environment, one or more available seats on aircraft associated with the one or more flight schedule records that accommodate passengers having the specified body type;

communicating, to the user terminal, seat availability information that specifies the one or more available seats to the user terminal;

receiving, from the user terminal, a booking indication associated with a particular flight schedule of the flight schedules; and updating the training data to associate the particular flight schedule with the flight preference information specified by the user.

8. The system according to claim 7, wherein the flight schedule records specify an aircraft equipment type, wherein the instruction code is executable by the processor to perform operations comprising:

determining, by the machine learning logic, one or more flight schedule records related to a preferred equipment type specified in the flight preference information.

9. The system according to claim 7, wherein the flight schedule records specify an aircraft crew experience level, wherein the instruction code is executable by the processor to perform operations comprising:

determining, by the machine learning logic, one or more flight schedule records related to a preferred crew experience level specified in the flight preference information.

10. The system according to claim 7, wherein the instruction code is executable by the processor to perform operations comprising:

associating passengers with seats of aircraft that are associated with the one or more flight schedule records;

scanning the passengers as the passengers board the aircraft to classify body types of the passengers; and updating the one or more flight schedule records to relate the seats of the aircraft with body types of the passengers assigned to the seats.

11. The system according to claim 7, wherein the flight schedule records specify aircraft predicted flight turbulence levels, wherein the instruction code is executable by the processor to perform operations comprising:

determining, by the machine learning logic, one or more flight schedule records related to a preferred flight turbulence level specified in the flight preference information.

12. The system according to claim 7, wherein the instruction code is executable by the processor to perform operations comprising:

receiving an indication of an occurrence of a change associated with the particular flight schedule;

responsive to receiving to the indication, searching, by machine learning logic, for a different flight schedule related to the flight preference information specified by the user;

responsive to locating the different flight schedule, communicating the different flight schedule to the user terminal associated with the user;

receiving, from the user terminal, a further booking indication associated with the different flight schedule; and updating the training data to associate the different flight schedule with the flight preference information specified by the user.

13. A non-transitory computer-readable medium having stored thereon instruction code, wherein the instruction code is executable by a processor of a computer to perform operations comprising:

receiving, from a flight schedule database stored in an airline system that is in networked communication with the computer, one or more flight schedule records that relate flight schedules selected by passengers and flight preference information associated with the passengers, wherein the airline system is configured to store flight schedule records to the flight schedule database responsive to scheduling of flights by passengers and wherein the flight schedule records specify an aircraft passenger seating environment that further specifies types of passengers assigned to seats of aircraft and the flight preference information specifies a preferred passenger seating environment;

automatically propagating the one or more flight schedule records as training data through machine learning logic of the computer to configure the machine learning logic to associate flight schedules with passenger preferences;

subsequently receiving from a user terminal, flight preference information specified by a user;

determining, by the machine learning logic, one or more flight schedule records related to the flight preference information specified by the user including the preferred passenger seating environment that specifies a body type associated with the user;

responsive to determining the one or more flight schedule records, communicating flight schedules associated with the one or more flight schedule records to the user terminal associated;

identifying, based on the passenger seating environment, one or more available seats on aircraft associated with the one or more flight schedule records that accommodate passengers having the specified body type;

communicating, to the user terminal, seat availability information that specifies the one or more available seats to the user terminal;

receiving, from the user terminal, a booking indication associated with a particular flight schedule of the flight schedules; and updating the training data to associate the particular flight schedule with the flight preference information specified by the user.

14. The non-transitory computer-readable medium according to claim 13, wherein the flight schedule records specify an aircraft equipment type, wherein the instruction code is executable by the processor of the computer to perform operations comprising:

determining, by the machine learning logic, one or more flight schedule records related to a preferred equipment type specified in the flight preference information.

15. The non-transitory computer-readable medium according to claim 13, wherein the flight schedule records specify an aircraft crew experience level, wherein the instruction code is executable by the processor of the computer to perform operations comprising:

determining, by the machine learning logic, one or more flight schedule records related to a preferred crew experience level specified in the flight preference information.

16. A computer-implemented method comprising:

receiving, by a passenger service system and from a flight schedule database stored in an airline system that is in networked communication with the passenger service system, one or more flight schedule records that relate flight schedules selected by passengers and flight preference information associated with the passengers, wherein the airline system is configured to store flight schedule records to the flight schedule database responsive to scheduling of flights by passengers;

automatically propagating, by the passenger service system, the one or more flight schedule records as training data through machine learning logic of the passenger service system to configure the machine learning logic to associate flight schedules with passenger preferences;

subsequently receiving, by the passenger service system and from a user terminal, flight preference information specified by a user;

determining, by the machine learning logic of a computer, one or more flight schedule records related to the flight preference information specified by the user;

responsive to determining the one or more flight schedule records, communicating, by the passenger service system, flight schedules associated with the one or more flight schedule records to the user terminal;

receiving, from the user terminal, a booking indication associated with a particular flight schedule of the flight schedules;

updating, by the passenger service system, the training data to associate the particular flight schedule with the flight preference information specified by the user; and associating passengers with seats of aircraft that are associated with the one or more flight schedule records;

scanning the passengers as the passengers board the aircraft to classify body types of the passengers; and updating the one or more flight schedule records to relate the seats of the aircraft with body types of the passengers assigned to the seats.

17. The computer-implemented method according to claim 16, wherein the flight schedule records specify an aircraft equipment type, wherein determining one or more flight schedule records related to the flight preference information specified by the user comprises determining, by the machine learning logic one or more flight schedule records related to a preferred equipment type specified in the flight preference information.

18. The computer-implemented method according to claim 16, wherein the flight schedule records specify an aircraft crew experience level, wherein determining one or more flight schedule records related to the flight preference information specified by the user comprises determining, by the machine learning logic one or more flight schedule records related to a preferred crew experience level specified in the flight preference information.

19. The computer-implemented method according to claim 16, wherein the flight schedule records specify aircraft predicted flight turbulence levels, wherein determining one or more flight schedule records related to the flight preference information specified by the user comprises determining, by the machine learning logic of the computer, one or more flight schedule records related to a preferred flight turbulence level specified in the flight preference information.

20. The computer-implemented method according to claim 16, further comprising:

receiving, by the computer, an indication of an occurrence of a change associated with the particular flight schedule;

responsive to receiving to the indication, searching, by machine learning logic of the computer, for a different flight schedule related to the flight preference information specified by the user;

responsive to locating the different flight schedule, communicating, by the computer, the different flight schedule to the user terminal associated with the user;

receiving, from the user terminal, a further booking indication associated with the different flight schedule; and updating the training data to associate the different flight schedule with the flight preference information specified by the user.

\* \* \* \* \*